US 7,492,386 B2

(12) United States Patent
Nichols et al.

(10) Patent No.: US 7,492,386 B2
(45) Date of Patent: Feb. 17, 2009

(54) DISPLAY MANAGEMENT DURING A MULTI-PARTY CONVERSATION

(75) Inventors: Paul Henry Nichols, Raleigh, NC (US); Myra Louise Rice, Durham, NC (US); Carey Lloyd Moulton, Raleigh, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 731 days.

(21) Appl. No.: 10/982,655

(22) Filed: Nov. 5, 2004

(65) Prior Publication Data

US 2006/0098085 A1  May 11, 2006

(51) Int. Cl.
*H04N 7/14* (2006.01)
*G06F 3/00* (2006.01)

(52) U.S. Cl. ............... 348/14.07; 348/14.08; 348/14.09

(58) Field of Classification Search .............. 348/14.01, 348/14.09, 14.1, 14.11, 14.12, 14.13, 14.16; 715/753; 370/260, 261
See application file for complete search history.

(56) References Cited

U.S. PATENT DOCUMENTS

| | | | |
|---|---|---|---|
| 5,410,649 | A | 4/1995 | Gove |
| 5,533,110 | A | 7/1996 | Pinard et al. |
| 5,896,128 | A * | 4/1999 | Boyer ..................... 715/716 |
| 6,661,426 | B1 | 12/2003 | Jetha et al. |
| 6,775,362 | B1 | 8/2004 | Ransom |
| 7,058,168 | B1 * | 6/2006 | Knappe et al. ......... 379/204.01 |
| 2002/0006804 | A1 | 1/2002 | Mukai et al. |
| 2002/0093531 | A1 | 7/2002 | Bartie |
| 2002/0171682 | A1 | 11/2002 | Frank et al. |
| 2003/0142200 | A1 | 7/2003 | Canova et al. |
| 2004/0116130 | A1 | 6/2004 | Seligmann |

2004/0205504 A1  10/2004  Phillips

FOREIGN PATENT DOCUMENTS

EP         5 533 110       2/2002

(Continued)

OTHER PUBLICATIONS

Network Working Group Request for Comments 1889, "RTP: A Transport Protocol for Real-Time Applications," The Internet Engineering Task Force (www.ietf.org), Jan. 1996, 71 pages.

(Continued)

*Primary Examiner*—Melur Ramakrishnaiah
(74) *Attorney, Agent, or Firm*—Coats & Bennett, P.L.L.C.

(57) ABSTRACT

A method and apparatus for managing a display during a teleconference between a primary participant and one or more secondary participants is described herein. According to the present invention, a primary image corresponding to the primary participant and a subset of secondary images that correspond to secondary participants are displayed on first and second sections of the display, respectively. By scrolling through the secondary images during the teleconference, different subsets of the secondary images may be displayed. Another exemplary embodiment of the present invention comprises superimposing an image over another image. By adjusting the opacity of at least one of the images, the user may view and/or access both images during the teleconference. According to another exemplary embodiment, a user may interchange the primary image with a selected one of the secondary images, responsive to user input, to focus on the selected image.

21 Claims, 8 Drawing Sheets

FOREIGN PATENT DOCUMENTS

| | | |
|---|---|---|
| EP | 1182639 | 2/2002 |
| GB | 2373977 | 10/2002 |
| WO | WO 2004/066615 | 8/2004 |

OTHER PUBLICATIONS

Network Working Group Request for Comments 3261, "SIP: Session Initiation Protocol," The Internet Engineering Task Force (www.ietf.org), Jun. 2002, 252 pages.

Patent Abstracts of Japan, Apr. 30, 1996, Matsushita Electric Ind Co Ltd.

PCT International Search Report, International Application No. PCT/US2005/026493, Nov. 30, 2005.

Annex to Form PCT/ISA/206, Communication Relating to the Results of the Partial International Search.

PCT International Search Report, International Application No. PCT/US2005/026493, Mailed Jan. 19, 2006.

* cited by examiner

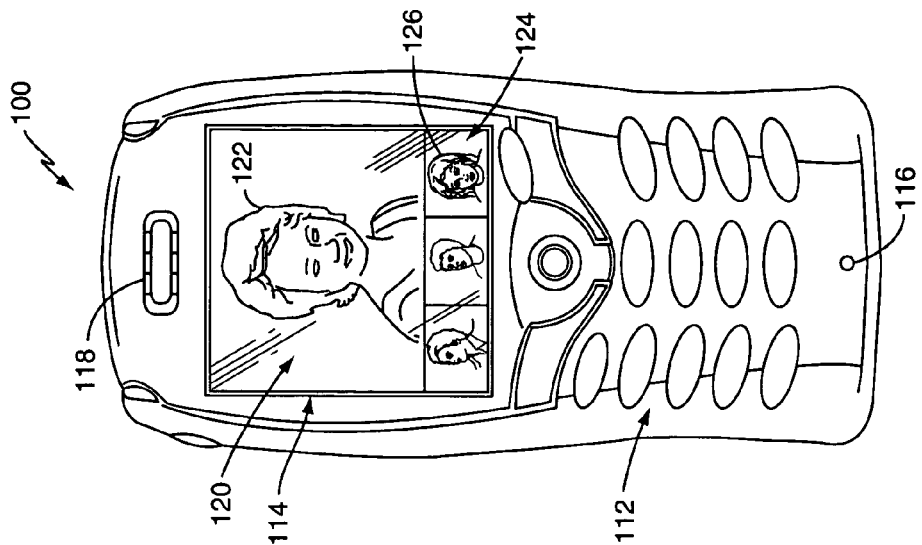
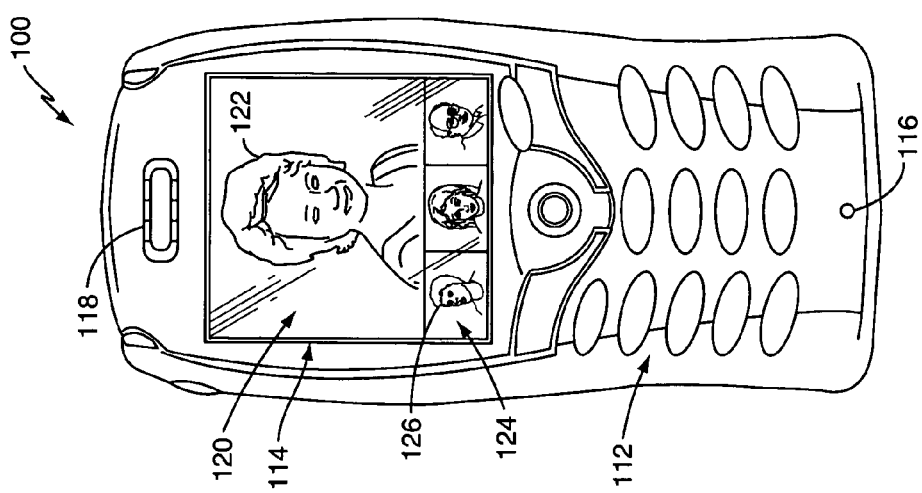
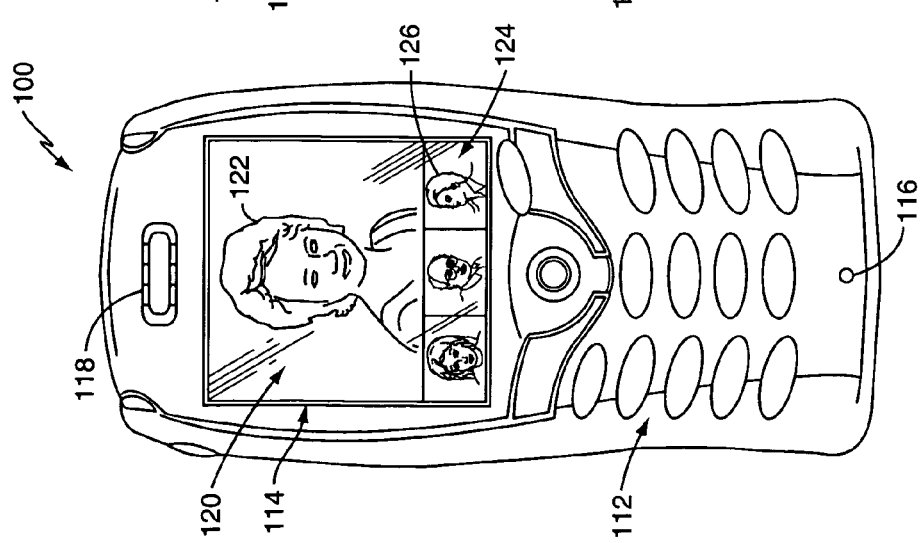

DISPLAY MANAGEMENT DURING A MULTI-PARTY CONVERSATION

BACKGROUND OF THE INVENTION

The present invention relates generally to display management and more particularly to the management of a wireless communication device display during a teleconference.

As wireless communication devices evolve, their ability to implement a wide variety of operations and/or communication applications increases. For example, instead of simply using a wireless communication device to make person-to-person phone calls, users may also use their wireless communication devices to take photographs, capture video, receive and send email, browse the Internet, participate in push-to-talk sessions, and participate in teleconference calls, including video teleconference calls.

Of particular interest are wireless video teleconferences that enable users located in a variety of locations all over the world to participate in a teleconference at any desired time. During a video teleconference, users are often limited to the default display established by the network and/or the wireless communication device during call setup. However, as appreciated by all wireless users, displays on wireless communication devices are relatively small. As a result, users are not always able to view desired information and/or images during the teleconference. Further, because images associated with the teleconference typically utilize the entire display, users generally do not have access to other features of their wireless communication device during the teleconference.

SUMMARY OF THE INVENTION

The present invention comprises a method for managing a display during a teleconference between a primary participant and one or more secondary participants. One exemplary method of the present invention includes displaying a primary image corresponding to the primary participant on a first section of the display and displaying a subset of a series of secondary images that correspond to the secondary participants on a second section of the display. By scrolling through the secondary images during the teleconference, a different subset of the secondary images can be displayed in the second section.

Another exemplary method of the present invention comprises displaying a first image on a first layer of a display, and displaying a second image on a second layer of the display. Alternatively, the second image may be superimposed over at least a portion of the first image on the display. In any event, during the teleconference, the opacity of at least one of the first and second layers/images is adjusted to provide simultaneous access to both images.

According to another exemplary method, a first section of a display displays a primary image corresponding to a primary participant of the teleconference, while a second section of a display displays one or more secondary images, where each secondary image corresponds to a secondary participant of the teleconference. Based on user input, a user may interchanged the primary image with a selected one of the secondary images, enabling the user to focus on the selected secondary image.

The present invention also comprises a wireless communication device configured to facilitate a teleconference between a primary participant and one or more secondary participants. According to one embodiment, the communication device comprises a display configured to display a primary image corresponding to the primary participant in a first section of the display, and to display a subset of a series of secondary images in a second section of the display, where each secondary image corresponds to one of the secondary participants. A controller included with the wireless communication device is configured to scroll through the secondary images to display a different subset of the secondary images. Alternatively, the controller may be configured to interchange the primary image with a selected one of the secondary images based on user input.

In another embodiment, the wireless communication device of the present invention comprises a display configured to display a first image on a first layer and a second image on a second layer. A controller included with the wireless communication device is configured to adjust an opacity of at least one of the first and second layers to provide simultaneous access to the images displayed on the first and second layers during the teleconference.

BRIEF DESCRIPTION OF THE DRAWINGS

FIGS. 4A-4C illustrate one exemplary embodiment for managing the display of the wireless communication device during a teleconference.

DETAILED DESCRIPTION OF THE INVENTION

The present invention comprises a wireless communication device that facilitates teleconference calls between a plurality of participants. As used herein, the terms "wireless communication device" and "communication device" may include any device having a cellular wireless transceiver and a display; a Personal Communication System (PCS) terminal that may combine a wireless transceiver with data processing, facsimile, and data communication capabilities; a Personal Digital Assistant (PDA) that can include a wireless transceiver, pager, Internet/intranet access, web browser, organizer, calendar, and/or a global positioning system (GPS) receiver; a conventional laptop and/or palmtop receiver; a pager; or any other mobile device that includes a wireless transceiver to communicate information via a wireless interface.

Figure 1:
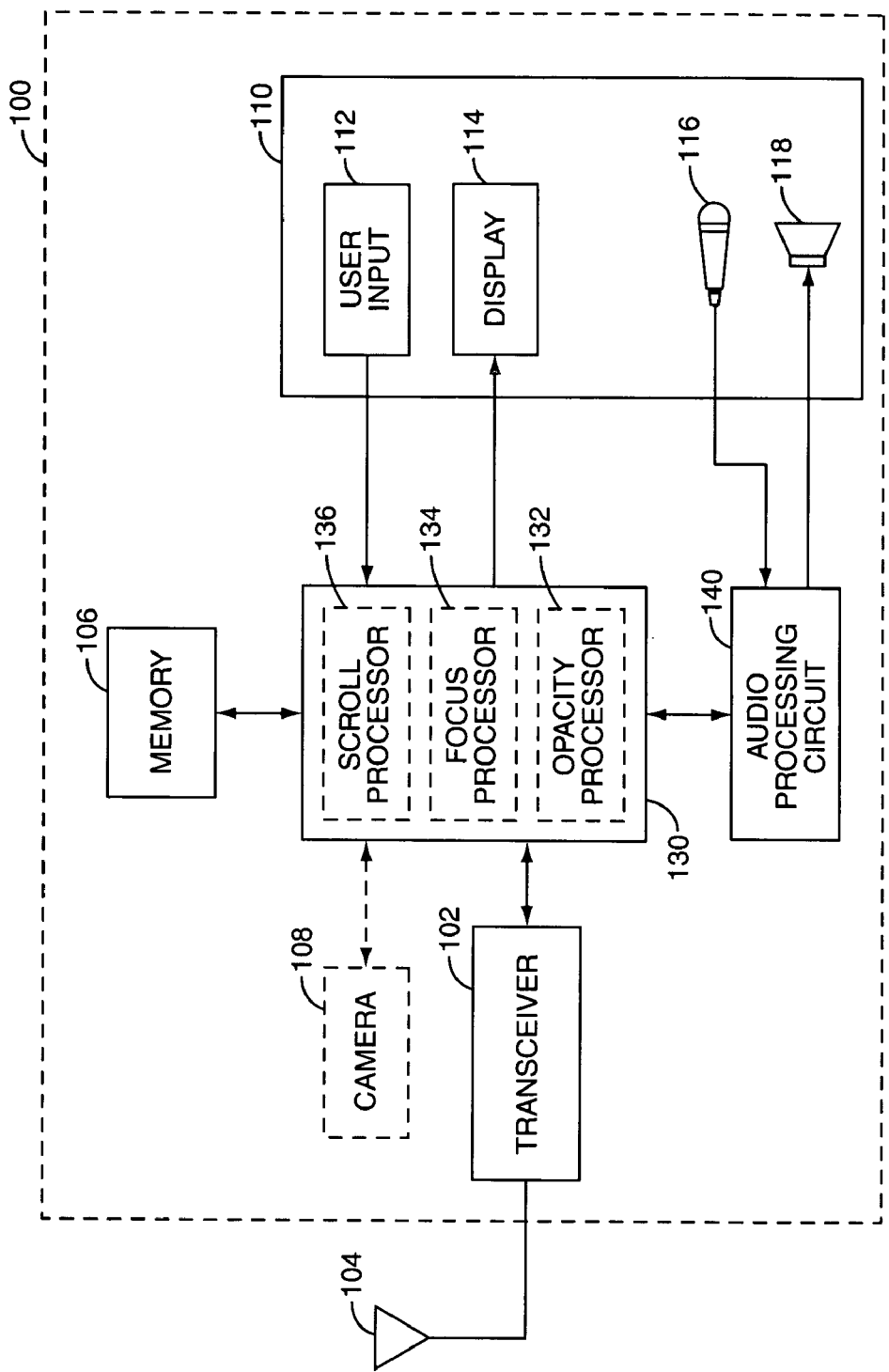
FIG. 1 illustrates one exemplary block diagram for the wireless communication device.

FIG. 1 illustrates a block diagram of an exemplary wireless communication device 100 according to one or more embodiments of the present invention. Communication device 100 includes transceiver 102, antenna 104, memory 106, user interface 110, system processor 130, audio processing circuit 140, and optional camera 108. User interface 110 includes one or more user input devices 112 and a display 114 that enables the user to interact with and control communication device 100. The user input devices 112 may include a keypad, touchpad, joystick, control buttons, other input devices, or a combination thereof. User input devices 112 allow the operator to enter numbers, characters, or commands, and scroll through menus and select menu items presented to the user on display 114. Display 114 allows the user to view information such as menus and menu items, dialed digits, images, call status information, and output from user applications. It will be appreciated that display 114 may comprise any known display, such as a flat panel display, holographic display, multi-layer display, etc.

User interface 110 may also include a microphone 116 and a speaker 118. Microphone 116 receives audio input from the user, while speaker 118 projects audible sound to the user. In particular, microphone 116 converts the detected speech and other audible signals into electrical audio signals and speaker 118 converts analog audio signals into audible signals that can be heard by the user. Audio processing circuit 140 receives analog audio inputs from microphone 116 and provides the basic analog output signals to speaker 118. It will be appreciated that audio processing circuit 140 may include a voice recognition system (not shown) that receives and processes vocal instructions from the user.

Wireless communication device 100 may also include an optional camera 108. Camera 108 captures all or part of images according to any means known in the art. Camera 108 may be used to capture still pictures or full motion video, which are transmitted to and displayed in real-time on other wireless communication devices 100 participating in a video conference.

System processor 130 performs various processing tasks, including controlling the overall operation of communication device 100 according to programs stored in memory 106. Memory 106 may include both random access memory (RAM) and read-only memory (ROM). Computer program instructions and data required for operation of communication device 100 are stored in non-volatile memory, such as EPROM, EEPROM, and/or flash memory, which may be implemented as discrete devices, stacked devices, or integrated with system processor 130.

System processor 130 may be implemented in hardware, firmware, software, or any combination thereof, and may comprise one or more microprocessors. The microprocessors may be general-purpose microprocessors, digital signal processors, or other special purpose processors. Functions performed by system processor 130 may include signal processing, image processing, and/or control of the overall operation of mobile device 100. In accordance with the present invention, and as discussed in greater detail below, system processor 130 may optionally include an opacity processor 132, a focus processor 134, and/or a scroll processor 136. While these individual processors 132, 134, 136 are shown as being part of system processor 130, it will be appreciated that one or more of the opacity processor 132, focus processor 134, and scroll processor 136 may be separate from system processor 130.

To communicate with other devices, communication device 100 includes at least one transceiver 102 coupled to an antenna 104. Transceiver 102 may operate according to any known standard, such as Global System for Mobile Communications (GSM), TIA/EIA-136, cdmaOne, cdma2000, UMTS, and Wideband CDMA. In addition, transceiver 102 may include baseband processing circuits to process signals transmitted and received by the transceiver 102. Alternatively, baseband processing circuits may be incorporated with system processor 130.

A wireless communication device 100 according to the present invention provides an improvement in real-time communications, such as video teleconferences. In particular, the present invention provides a method and apparatus for managing a display 114 of a wireless communication device 100 during a video teleconference. As understood by those skilled in the art, display 114 typically displays one or more images associated with one or more participants in a teleconference. As used herein, the term "image" may include, but is not limited to, still photographs, caricatures, video images resulting from video stream, or any other image representative of a teleconference participant. It will be appreciated that a particular teleconference may include only video images, only still images, or a combination of video and still images. Further, the term "image" may also include application icons, file images, or any other application-based image.

Figure 2:
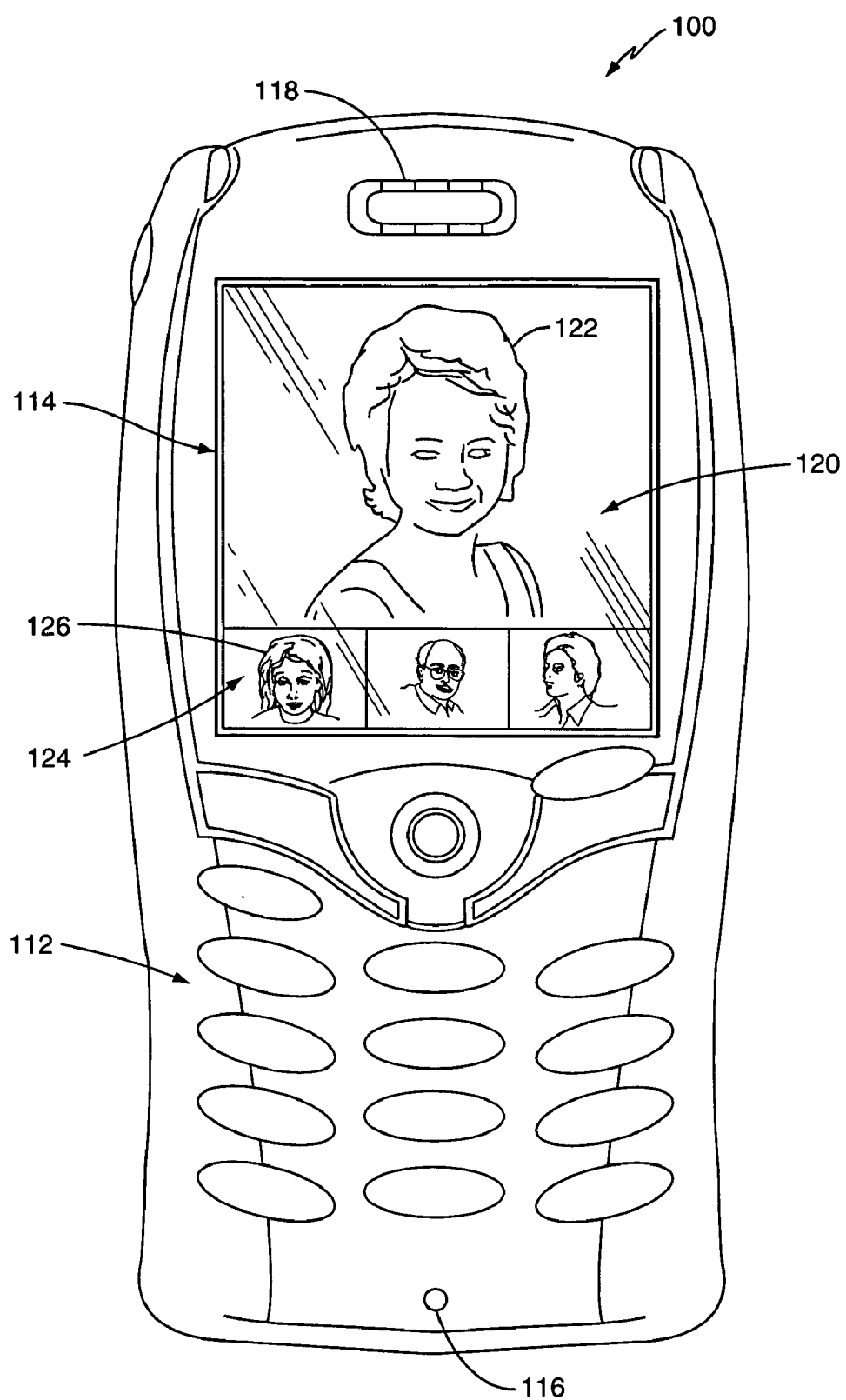
FIG. 2 illustrates one exemplary wireless communication device according to the present invention.
Figure 3:
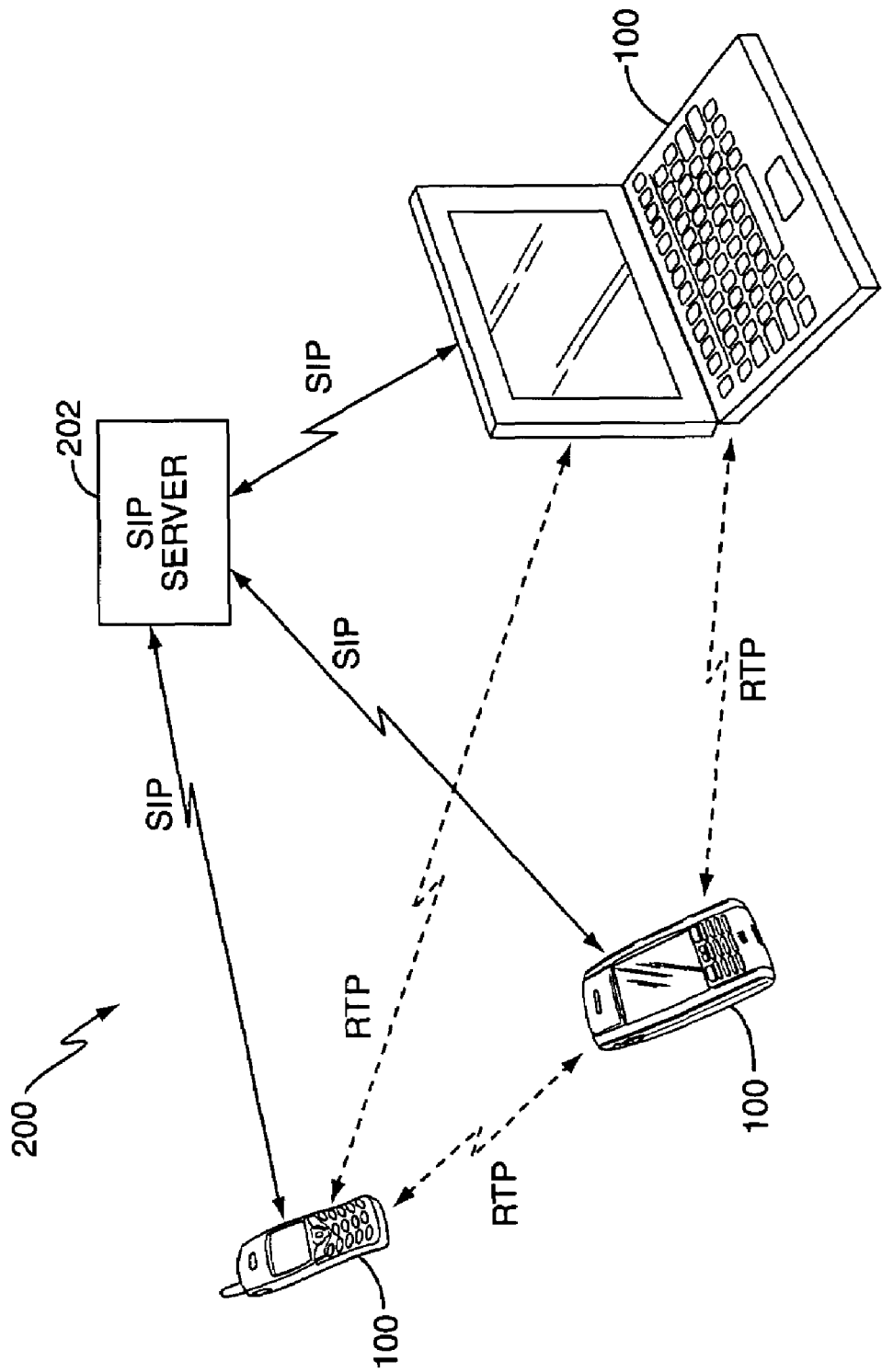
FIG. 3 illustrates one exemplary wireless network.

FIG. 2 illustrates an exemplary communication device 100 having a display 114 that displays images corresponding to teleconference participants. Each of the displayed images, along with any corresponding audio signals, are received from remote communication devices 100 during the teleconference according to any known means. As understood by those skilled in the art, voice and data associated with the teleconference may be communicated between multiple wireless communication devices 100 over a wireless network using one or more networking protocols. For example, voice and data associated with the teleconference may be communicated between multiple wireless communication devices 100 over a wireless network using Session Initiation Protocol (SIP) and Real-time Transfer Protocol (RTP). SIP is a text-based, application-layer protocol that can be used to initiate interactive voice, video, and messaging communication sessions between multiple users. RTP is a transport protocol that provides end-to-end delivery sevices for data with real-time characteristics. After a session is established between SIP server 202 and one or more wireless communication devices 100 using SIP, the audio and voice data is transferred between the wireless communication devices 100 using RTP, as shown in FIG. 3. For more information and a detailed description of the SIP protocol, the interested reader is referred to the Internet Engineering Task Force (IETF) Request for Comments (RFC) 3261 entitled "SIP: Session Initiation Protocol" and dated June 2002. For more information and a detailed description of the RTP protocol, the interested reader is referred to the IETF RFC 1889 entitled "RTP: A Transport Protocol for Real-Time Applications" dated January 1996.

Referring back to FIG. 2, the illustrated wireless communication device 100 includes a display 114 that comprises a primary section 120, and a smaller, secondary section 124. Primary section 120 displays a primary image 122 associated with a primary participant, while secondary section 124 displays three secondary images 126 associated with three different secondary participants. While FIG. 2 only illustrates three images 126 associated with three secondary participants, it will be appreciated that the present invention is not so limited. For example, secondary section 124 may be configured to display less than or more than three images 126, depending on the size of the display 114, the resolution of the display 114, and/or user preference. Further, while FIG. 2 shows that secondary section 124 is disposed along a bottom of display 114, those skilled in the art will appreciate that secondary section 124 may be disposed in any convenient portion of display 114, such as along a top, a side, in a middle portion, etc.

It will be appreciated that because display 114 is relatively small, display 114 may not be able to simultaneously display images for all secondary participants. As such, the images 126 in secondary section 124 may represent a subset of a series of secondary images 126 corresponding to the secondary participants. To enable the user to view other subsets of secondary images 126, wireless communication device 100 may include a scroll processor 136 configured to implement a scrolling feature associated with the secondary section 124 of display 114. As shown in FIGS. 4A-4C, scroll processor 136 scrolls the secondary images 126 from left to right to display different subsets of secondary images 126. While FIGS. 4A-4C illustrate scrolling from left to right, it will be appreciated that scroll processor 136 may scroll through the secondary images 126 in any direction.

In one exemplary embodiment, scroll processor 136 may be configured to automatically scroll the secondary images 126 to enable the user to periodically view different subsets of secondary images 126. Alternatively, scroll processor 136 may be configured to scroll through the secondary images 126 responsive to user input. The user may provide input using any known means, as discussed further below. It will be appreciated that the user may set up scroll processor 136 for either automatic or manual scrolling at any time before or during a teleconference.

Figure 5:
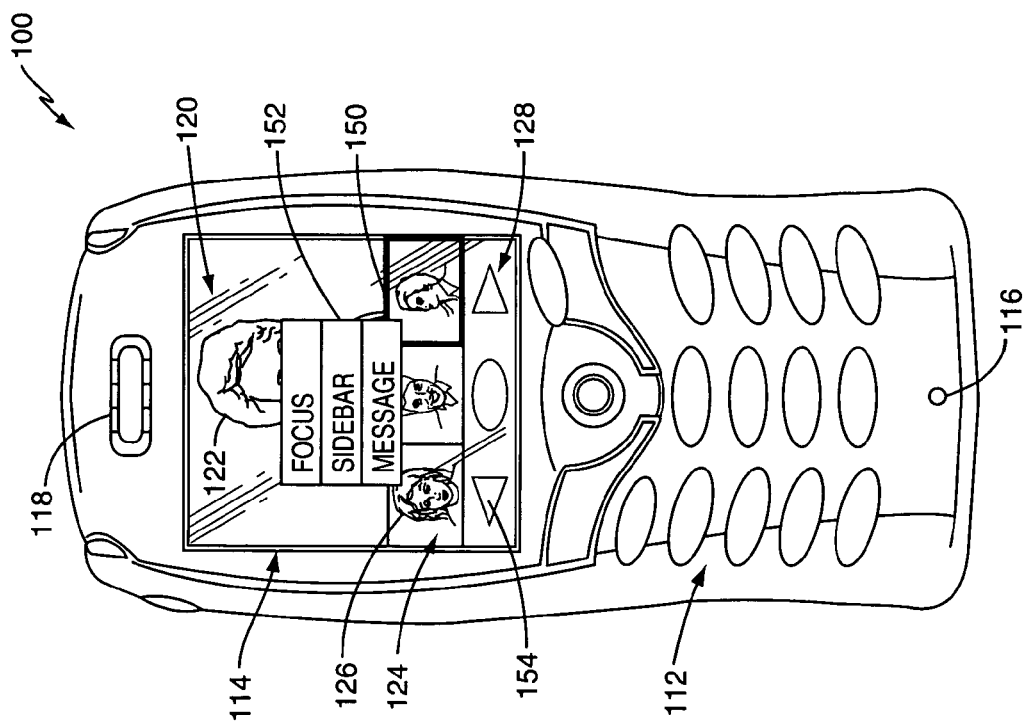
FIG. 5 illustrates another exemplary embodiment for managing the display of the wireless communication device during a teleconference.

As discussed above, scrolling the secondary images 126 enables the user to view different subsets of the secondary images 126 at different times. In addition, according to another exemplary embodiment of the present invention, the user may use the scrolling feature to find and select a particular participant. Once selected, the user may execute a specified option regarding the selected participant. For example, as shown in FIG. 5, after scrolling to and selecting the image 126 of the secondary participant 126 in the far right of secondary section 124, the user activates a control button to display a menu of options 152. The control button may be any button on user input 112 and/or may comprise a soft key 154 on a control section 128 of display 114. In any event, the wireless communication device 100 executes a selected option relative to the selected participant. For example, the user may select "sidebar" to request a sidebar conversation with the selected participant. Responsive to the request, wireless communication device 100 invites the selected participant to participate in a sidebar and establishes the sidebar if/when the selected participant accepts the invitation. Alternatively, the user may select "message" to transmit a message to the selected participant. While not explicitly shown, menu 152 may display other known options. In addition, menu 152 may display other options taught by the present invention, such as "focus" and "opacity," which are discussed further below.

The above describes scrolling images 126 of secondary participants to view and/or select various participants during a teleconference. However, the present invention is not limited to the scrolling capability discussed above. The present invention may also or alternatively include a focusing capability.

As shown in the figures, the primary section 120 provides a larger view of the primary image 122 as compared to the secondary images 126 in the secondary section 124. This enables the user to focus on the primary participant. By default, the primary image 122 is typically associated with the current speaker. However, there are many situations where the user may prefer to focus on an image associated with a different participant. For example, the user may prefer to focus on an image 126 associated with one of the secondary participants to monitor reactions to the speaker's words. Alternatively, the user may prefer to focus on a message sent by a secondary participant, or on different images associated with the primary participant, such as a document, message, etc.

Figure 6B:
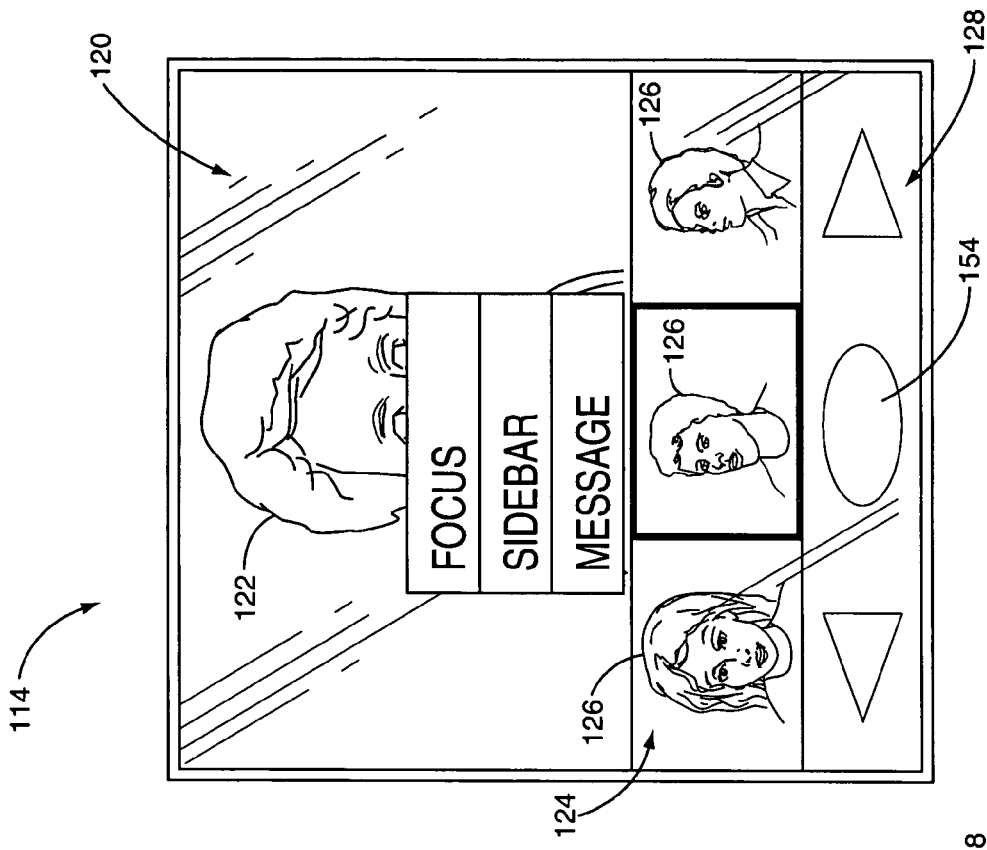
FIGS. 6A-6C illustrate another exemplary embodiment for managing the display of the wireless communication device during a teleconference.
Figure 6A:
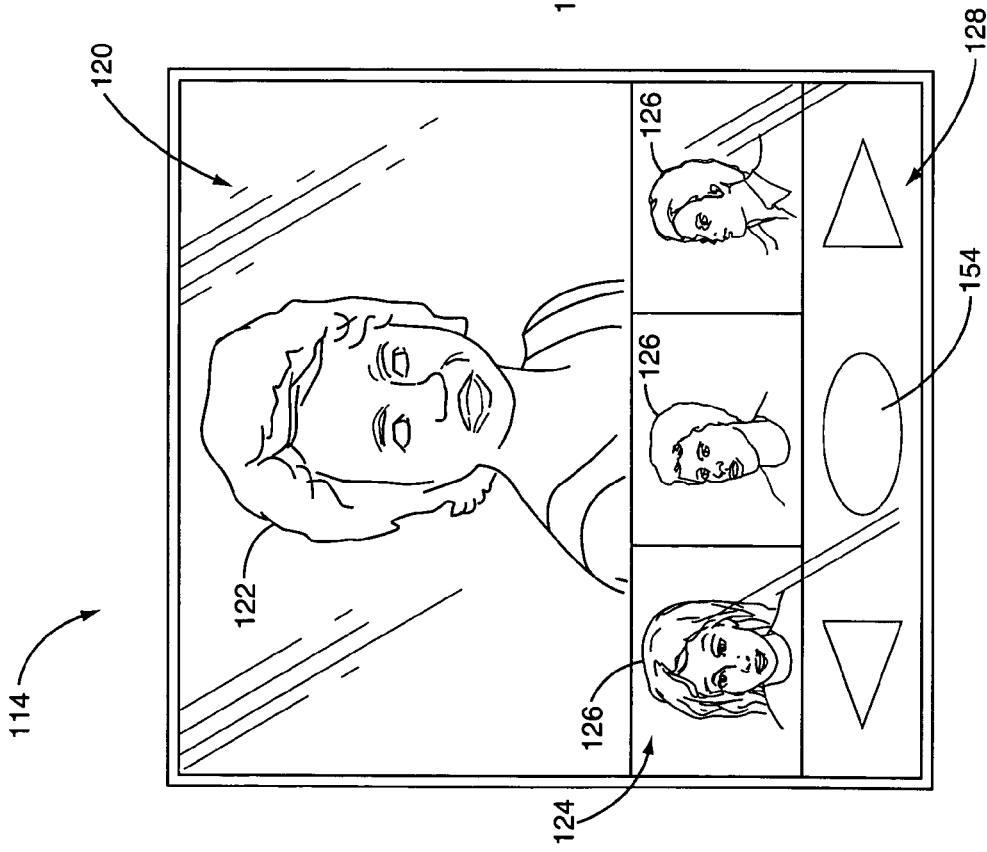
Figure 6C:
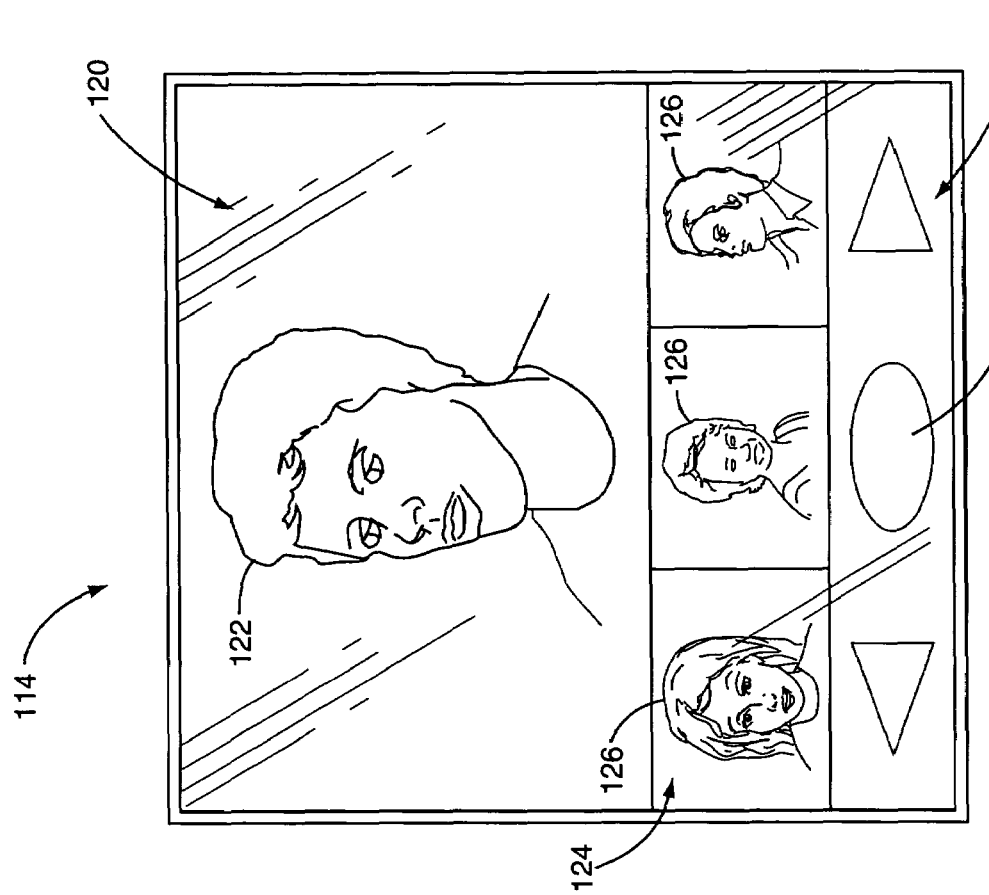
Figure 7C:
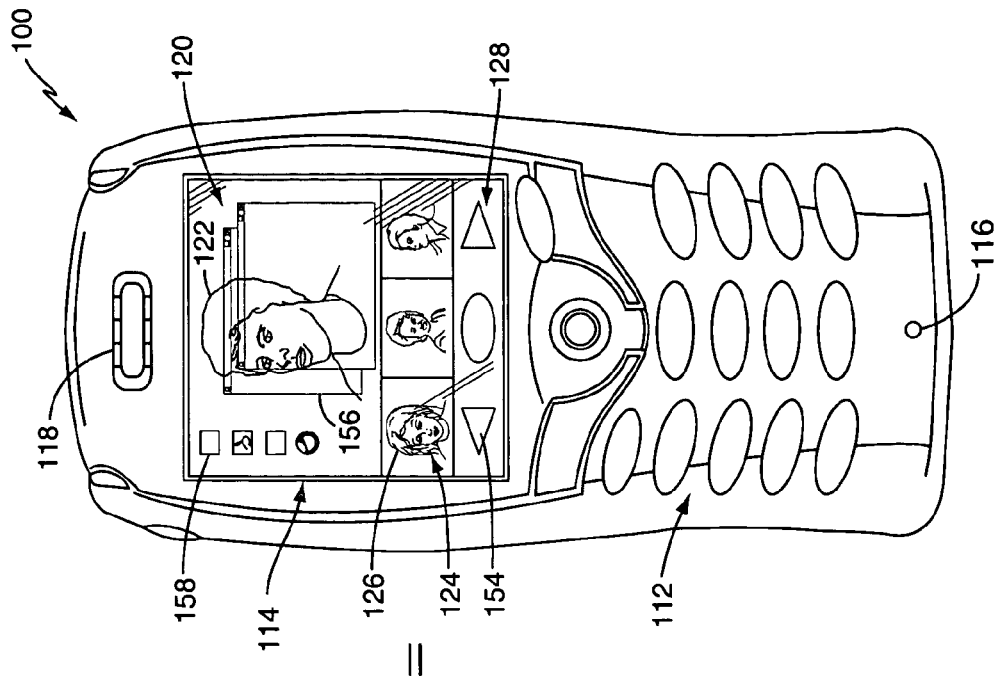
FIGS. 7A-7C illustrates another exemplary embodiment for managing the display of the wireless communication device during a teleconference.
Figure 7B:
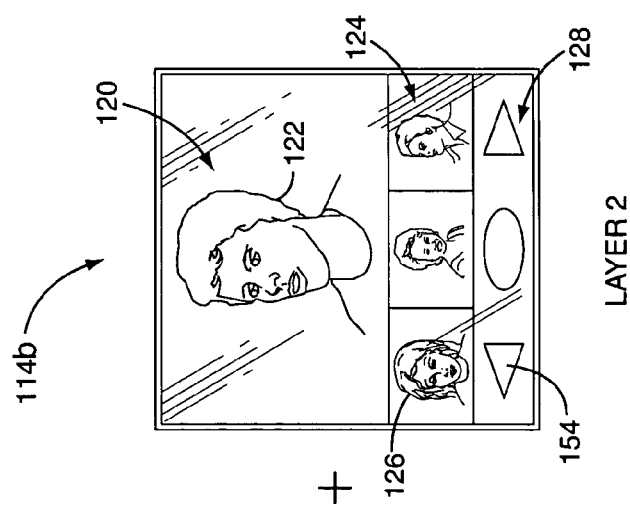
Figure 7A:
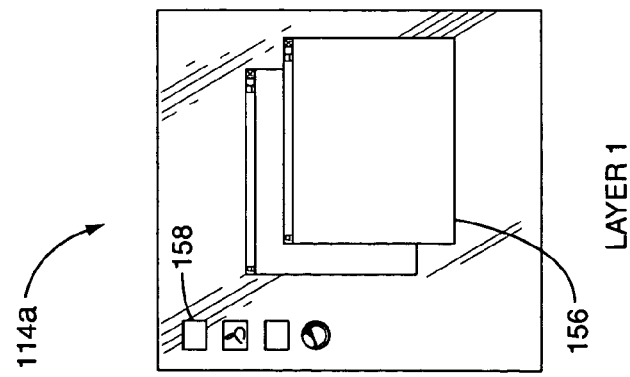

To address this problem, one exemplary embodiment of the present invention may include a focus processor 134 configured to interchange the speaker's image with a selected image responsive to user input. For example, the user may select the image 126 of the gentleman in the center block of secondary section 124 (FIG. 6A). After the user selects "focus" from the menu of options 152 (FIG. 6B), focus processor 134 interchanges the image 122 of the speaker in the primary section 120 in FIG. 6A with the image 126 of the selected gentleman (FIG. 6C). As a result, the image of the selected gentleman is now the primary image 122, and the image of the speaker is a secondary image 126. This enables the user to focus on the image of the selected participant to, for example, focus on their expressions and/or behavior. While this example illustrates interchanging the primary image 122 with a selected secondary image 126, those skilled in the art will appreciate that focus processor 134 may alternatively interchange the primary image 122 with any selected image, such as an application image, application file, message from the primary or a secondary participant, etc.

The above describes different ways to manipulate the position (scrolling, focusing, etc.) of primary and secondary images on display 114. However, the present invention may also enable the user to control other aspects of display 114 during a teleconference. For example, it will be appreciated that during the teleconference, the primary and secondary sections 120, 124 take up most if not all of display 114. As such, the user cannot view or access other images, files, applications, etc., normally visible on display 114.

To address this problem, the present invention may include an opacity processor 132. In one embodiment, opacity processor 132 is configured to adjust the opacity of one or more images that overlap at least a portion of one or more different images on display 114 responsive to user input. More particularly, when one or more of the teleconference images, such as the primary image 122, secondary images 126, etc., are superimposed over at least some portion of one or more desktop images, such as application icons 158, file images 156, etc., the user cannot view or access the desktop images during the teleconference. The opacity processor 132 addresses this problem by enabling the user to modify the opacity of the images on display 114. By, for example, reducing the opacity of one or more of the teleconference images 122, 126, the user may view and/or access both the teleconference images 122, 126 and desktop images 156, 158 during the teleconference (see FIG. 8C). As a result, the user may access any desktop image 156, 158 and the associated files, such as a business calendar, meeting notes, etc., during the teleconference.

In another embodiment, opacity processor is configured to adjust the opacity of one or more layers of a multi-layer display 114. As understood by those skilled in the art, a multi-layer display combines several layers of images by simultaneously displaying all layers. According to one embodiment of the present invention, the multi-layer display 114 may include a desktop and one or more teleconference layers. A desktop layer 114a may include multiple desktop images, such as application icons 158, files 156, etc., as shown in FIG. 8A. A teleconference layer 114b may include multiple teleconference images, i.e., the primary image 122, secondary images, 126, and soft key controls 154, as shown in FIG. 8B. Alternatively, the primary image 122, the secondary images 126, and/or soft key controls 154 may be on separate teleconference layers (not shown). In any event, opacity processor 132 may modify the opacity of one or more display layers to enable the user to view and access images on different layers (see FIG. 8C). For example, the bottom layer may comprise the teleconference layer having 100% opacity. When the desktop layer overlaps the teleconference layer, the user cannot see all of the teleconference images 122, 126, 154. To simultaneously view the desktop images 156, 158 and teleconference images 122, 126, 154, opacity processor 132 may adjust the opacity of the desktop layer to 30%. As a result, the desktop images 156, 158 are partially translucent, enabling the user to see and/or access both the desktop and teleconference images 122, 126, 154, 156, 158.

While the above describes adjusting the opacity of a particular image/layer, it will be appreciated that the opacity processor 132 may be configured to adjust the opacity of any image/layer on display 114. In general, opacity processor 132 may be configured to reduce the opacity of one or more of the overlapping images/layers. Alternatively, when the default setting of display 114 is configured to display images/layers at 50% opacity, opacity processor 132 may increase the opacity of an overlapped image/layer to increase the visibility of the overlapped image/layer. Further, it will be appreciated that the opacity of an overlapped image/layer may be increased while the opacity of an overlapping image/layer is decreased. In any event, adjusting the opacity of one or more images/layers enables the user to view and/or access other images besides the teleconference images 122, 126, 154 during a teleconference.

According to one embodiment of the present invention, opacity processor 132 may adjust the opacity of one or more images/layers responsive to user input. Alternatively, opacity processor 132 may automatically adjust the opacity based on predetermined conditions. For example, during a teleconference the teleconference images 122, 126 may have 100% opacity, while overlapping desktop images 156, 158 may have 30% opacity. However, when the user accesses a desktop image 156, 158, opacity processor 132 may automatically increase the opacity of the selected desktop image 156, 158 so the user may better view the accessed image. In any event, it will be appreciated that opacity processor 132 may adjust the opacity to any opacity value, and typically adjusts the opacity of one or more images to between 20% and 80%.

The above describes various methods and apparatus for managing images on a display 114 during a teleconference. While each embodiment was described separately, it will be appreciated that one or more of the embodiments may be included with a single wireless communication device 100. For example, a wireless communication device 100 according to the present invention may place an image of the speaker in the secondary section 124 and vary the opacity of the image of the selected secondary participant to enable the user to view and access other images on display 114.

Further, the above is described in terms of images for primary and secondary participants. As used herein, the primary image 122 is the image displayed in the primary section 120 of display 114. The primary image 122 may be an image of the speaker, an image of a selected participant, or any other image selected by the user, i.e., a file image 156. The secondary images 126 are the images displayed in the secondary section 124 of display 114. The secondary images 126 may include images associated with the speaker and/or other non-speaking teleconference participants. As discussed above, the secondary images 126 displayed in secondary section 124 at any given time may comprise a subset of a series of images 126 associated with the teleconference participants.

The above discussions generally illustrate accessing a menu of options 152 to execute the various options associated with the secondary participants. However, those skilled in the art will appreciate that other means for implementing different options may also be used. For example, a soft key 154 or a button on user input 112 may be used to execute a desired function. Further, it will be appreciated that the menu of options 152 may also be available for options associated with the primary image 122.

As discussed above, the scroll processor 136, focus processor 134, and/or opacity processor 132 may execute scrolling, focusing and/or opacity operations responsive to user input. The user may provide the input using any known means, such as keypad 112, soft keys 154 on a control section 128 of display 114 (e.g., see FIG. 4), pop up menus, etc. Alternatively, the user may provide the input using body gestures. For example, a motion sensor, such as camera 108 associated with communication device 100, may detect body gestures, such as pointing, up/down motion, left/right motion, etc., and provide the signals corresponding to the detected gestures to signal processor 130. In response, system processor 130 executes the command associated with the detected body gesture. It will be appreciated that the user may generate the body gestures using a hand, finger, head, etc.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of managing a display during a teleconference between a primary participant and one or more secondary participants comprising:
    displaying a primary participant image corresponding to the primary participant in a first section of the display;
    displaying a subset of a series of secondary participant images in a second section of the display, wherein each secondary participant image corresponds to one of the secondary participants;
    scrolling through the secondary participant images and displaying different subsets of the secondary participant images during the teleconference;
    overlapping the primary participant image and at least a portion of a supplemental image; and
    adjusting an opacity of at least one of the primary participant and supplemental images to provide simultaneous access to the primary participant and supplemental images during the teleconference.

2. The method of claim 1 wherein scrolling through the secondary participant images comprises automatically scrolling through the secondary participant images during the teleconference.

3. The method of claim 1 wherein scrolling through the secondary participant images comprises manually scrolling through the secondary participant images responsive to user input.

4. The method of claim 3 wherein the user input comprises activating a control button or providing one or more body gestures detected by a motion sensor.

5. The method of claim 1 further comprising interchanging the primary participant image with a selected one of the secondary participant images based on user input.

6. The method of claim 5 further comprising interchanging the primary participant image with the supplemental image responsive to user input.

7. The method of claim 5 wherein the user input comprises activating a control button or providing one or more body gestures detected by a motion sensor.

8. The method of claim 1 further comprising accessing and launching an application associated with the supplemental image during the teleconference.

9. The method of claim 1 further comprising:
    selecting one or more of the secondary participant images for a sidebar communication;
    inviting the secondary participants corresponding to the selected secondary participant images to participate in the sidebar communication; and establishing the sidebar communication with each of the invited secondary participants that accept the invitation.

10. The method of claim 1 wherein the supplemental image comprises an application-specific image associated with the primary participant.

11. A communication device configured to facilitate a teleconference between a primary participant and one or more secondary participants comprising:

a display configured to display a primary participant image corresponding to the primary participant in a first section of the display and to display a subset of a series of secondary participant images in a second section of the display, wherein each secondary participant image corresponds to one of the secondary participants, and further configured to overlap the primary participant image and at least a portion of a supplemental image;

a controller configured to scroll through the secondary participant images to display different subsets of the secondary participant images during the teleconference; and an opacity processor configured to adjust the opacity of at least one of the supplemental and primary participant images to provide simultaneous access to the supplemental and primary participant images during the teleconference.

12. The communication device of claim 11 wherein the controller is configured to automatically scroll through the secondary participant images.

13. The communication device of claim 9 further comprising one or more control buttons, wherein the controller is configured to scroll through the secondary participant images responsive to user activation of the one or more control buttons.

14. The communication device of claim 13 wherein the one or more control buttons comprises one or more softkey control buttons displayed on a third section of the display.

15. The communication device of claim 11 further comprising a motion sensor, wherein the controller is configured to manually scroll through the secondary images responsive to one or more user gestures detected by the motion sensor.

16. The communication device of claim 11 further comprising a focus processor configured to interchange the primary participant image with a selected one of the secondary participant images based on user input.

17. The communication device of claim 16 wherein the focus processor is further configured to interchange the primary participant image with the supplemental image responsive to user input.

18. The communication device of claim 11 wherein the primary and secondary participant images each comprise at least one of a photograph, caricature, video image, and icon.

19. The communication device of claim 11 wherein the first section of the display is larger than the second section of the display.

20. The communication device of claim 11 wherein the display comprises at least one of a holographic display, a flat panel display, and a multi-layer display.

21. The communication device of claim 11 wherein the supplemental image comprises an application-specific image associated with the primary participant.

* * * * *

UNITED STATES PATENT AND TRADEMARK OFFICE
CERTIFICATE OF CORRECTION

PATENT NO. : 7,492,386 B2
APPLICATION NO. : 10/982655
DATED : February 17, 2009
INVENTOR(S) : Nichols et al.

It is certified that error appears in the above-identified patent and that said Letters Patent is hereby corrected as shown below:

In col. 9, claim 13 should read as follows: --The communication device of claim 11--

Signed and Sealed this

Thirtieth Day of June, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,492,386 B2 | Page 1 of 1 |
| APPLICATION NO. | : 10/982655 | |
| DATED | : February 17, 2009 | |
| INVENTOR(S) | : Nichols et al. | |

It is certified that error appears in the above-identified patent and that said Letters Patent is hereby corrected as shown below:

In col. 9, claim 13, line 30, should read as follows: --The communication device of claim 11--

This certificate supersedes the Certificate of Correction issued June 30, 2009.

Signed and Sealed this

Twenty-eighth Day of July, 2009

JOHN DOLL
*Acting Director of the United States Patent and Trademark Office*